United States Patent [19]

Farr

[11] Patent Number: 4,856,896

[45] Date of Patent: Aug. 15, 1989

[54] OPTICAL GUIDANCE SYSTEM AND APPARATUS

[75] Inventor: Aaron V. Farr, Ogden, Utah

[73] Assignee: Abex Corporation, Boston, Mass.

[21] Appl. No.: 109,622

[22] Filed: Oct. 16, 1987

[51] Int. Cl.⁴ .............................................. G01B 11/26
[52] U.S. Cl. .................... 356/153; 340/955; 356/399
[58] Field of Search ............... 340/953, 955, 958; 356/138, 153, 399

[56] References Cited

U.S. PATENT DOCUMENTS

| | | | |
|---|---|---|---|
| 2,559,415 | 7/1951 | Field et al. | 340/955 |
| 3,138,779 | 6/1964 | Murray, Jr. et al. | 340/955 |
| 3,821,697 | 6/1974 | Brown | 340/955 |
| 3,873,210 | 3/1975 | Konopka | 356/153 |
| 3,885,876 | 5/1975 | Konopka | 356/399 |
| 4,064,424 | 12/1977 | Hergenrother | 340/955 |

*Primary Examiner*—F. L. Evans
*Attorney, Agent, or Firm*—Thomas S. Baker, Jr.

[57] ABSTRACT

A unitary optical guidance system and apparatus directs operators of vehicles such as airplanes, watercraft, trucks, and automobiles along a path or to a predetermined location (e.g., parking an aircraft at a terminal gate or landing an aircraft on a runway) with a high degree of accuracy. The apparatus projects one or a plurality of different colored rays of light in separate and substantially parallel colored light lanes. Light from the apparatus generally is directed at an incident angle with respect to the operator of an approaching vehicle such that upon proximity of the vehicle to a predetermined location, one of the colored lanes of light will be seen by the operator. Where multiple lanes of light are projected, the initial lane color may be traversed until a final lane color is encountered indicating that a desired or predetermined location has been reached. A directional indicia media having one type of indicia to indicate a lateral approach position of a vehicle and a second type of indicia to indicate the distance of the vehicle from a predetermined location may be utilized with one or more lanes of light.

15 Claims, 4 Drawing Sheets

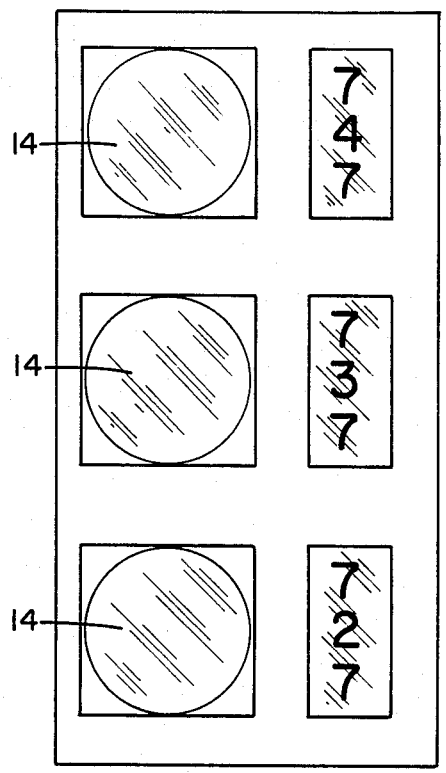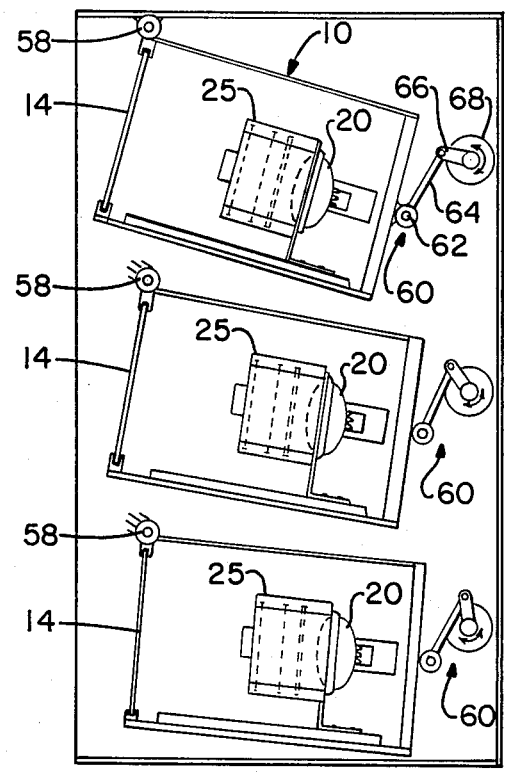
FIG.-3A
FIG.-3B

OPTICAL GUIDANCE SYSTEM AND APPARATUS

FIELD OF THE INVENTION

Guidance apparatus may be utilized to assist operators of vehicles in guiding or in parking a vehicle. In the present invention, a unitary optical guidance apparatus utilizes a positive focal point lens and a light source to generally project colored rays of light from a multicolored media onto a lens whereby the rays of light are projected outwardly in substantially parallel lanes to provide guidance to the operator.

BACKGROUND ART

One manual system for guiding operators of vehicles to a designated location or along a path, such as directing an aircraft pilot to a specific airport terminal parking position, requires that the pilot follow manual signals given by a ground crewman. Various optical guidance systems not involving crewman also have been utilized. One optical system for guiding an aircraft to a gate utilizes the principle of parallax and projects different colored light rays from two units at separate locations. One unit is located behind a desired parking location while the second unit is located to one side of the parking area. Each unit has two neon lights therein. With regard to a straight-in approach, a red neon tube is located in a front portion and a green neon light is located in a back portion of one unit. Thus, if a pilot were positioned to the left of the guide-in position, he would see green to the left and red to the right in each unit which would indicate he should move to the right. The pilot would continue to move towards the one unit and to adjust his position laterally until he saw only a red light from the one unit. When the plane was at the desired parking position, he also would see only red light projecting from the side unit.

Another optical system for guiding aircraft to a gate utilizes pickup coils embedded in the gate apron to detect the position of the aircraft as it approaches a desired parking position at the terminal gate. Lights activated by the pickup coils provide guidance to the pilot. Problems of this system include the necessity of cutting into the apron to install the pickup coils which is undesirable and expensive. Moreover, constant freezing and heating of the apron causes breakage of wires which extend from the coils to a processing device which operates the lights.

Yet another optical system for guiding an aircraft to a gate utilizes a moire pattern generated by slatted grids. Typically two such grids are located at spaced locations. A pattern is generated by the angle of the first slatted grid to produce an arrow pointing in the lateral direction that the pilot needs to move to become aligned with the parking position. The second grid indicates the longitudinal distance from the position. A disadvantage of this system is that the pilot must look back and forth to each grid.

Still another optical guidance system for guiding an aircraft to a gate utilizes an interference pattern generated by a very strong light source behind an optical slit focused on the back of a lenticular lens which produces a dark line thereon by refraction. A pair of these lens are utilized in each system. The dark line formed on one of the lens moves left or right indicating the lateral position of the aircraft with respect to the parking area. On the remaining lens, the dark line moves from the bottom to the top of the lens to indicate the longitudinal distance of the craft from the parking location.

In each of the above discussed optical systems, two separate and independent visual indicators are utilized and both must be observed by an operator.

It has been found desirable to provide an optical guidance system utilizing a visual indicator at one location for directing vehicles to a predetermined location or along a predefined path.

Also, it has been found desirable to provide a unitary optical guidance apparatus having directional indicia to indicate lateral position of a vehicle with respect to a predetermined position as well as approach distance of the vehicle from said position.

SUMMARY OF THE INVENTION

An optical guidance apparatus for directing a vehicle operator, having: a housing, with a positive lens mounted in one end of the housing. The lens has a focal point located outside thereof but within the housing. A color media is positioned in the housing in the vicinity of said focal point and a backlight is located at a position with respect to said focal point to substantially project the colors of the color media substantially outwardly of the housing toward the operator in a parallel colored lane after passing through the positive lens.

BRIEF DESCRIPTION OF THE DRAWINGS

FIG. 3A depicts a front elevational view of three unitary guidance apparatuses and illustrates the numbers adjacent each unit designating the type of aircraft which would be directed by that unit;

FIG. 3B is a side view of the three unitary guidance apparatuses illustrated in FIG. 3A.

DETAILED DESCRIPTION

Figure 1:
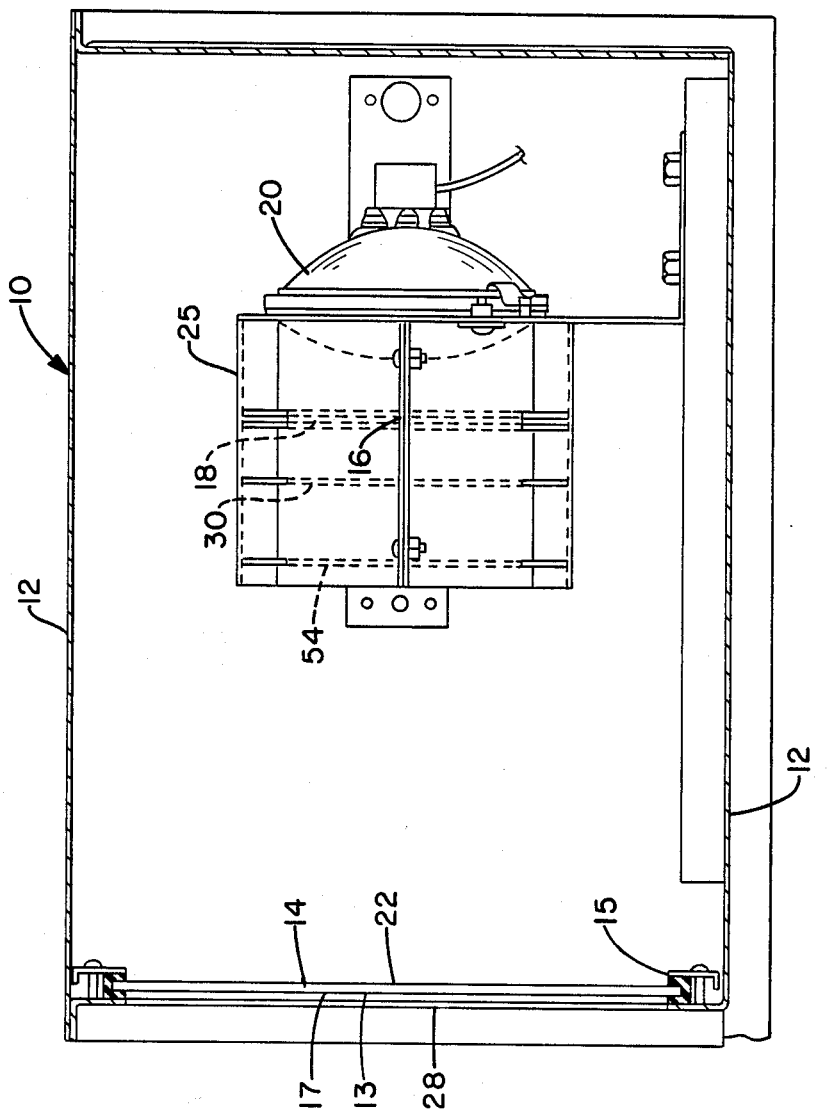
FIG. 1 is a diagrammatical side elevational view of optical guidance apparatus of the present invention with the side cover removed.

The unitary optical guidance apparatus 10 of the present invention may be seen by referring to FIG. 1. By the term "unitary," it is intended to mean that the device is complete in and of itself and the operator of a vehicle needs only to look at a single optical guidance apparatus 10 of the present invention to receive complete guidance to enable him to move his vehicle to a predetermined position P or along a desired path. The optical guidance apparatus 10 has a housing 12 containing a front, positive, objective lens 14 mounted in a holder 15. Conventional lens having a configuration such that light from a source within the housing 12 will be projected outwardly of the housing in an arc, that is, in an expanding corridor may be utilized. As an example a double-sided convex lens or a flat lens such as a fresnel lens may be used. Regardless of the type of lens utilized, the lens should be a positive lens having the characteristic that its focal point 16 resides outside of the lens but within a light enclosure 25. A transparent color media or film 18 which may be plastic or glass is positioned at or near the focal point 16 of lens 14 in light enclosure 25.

As apparent from FIG. 1, light enclosure 25 is located in the back portion of the unitary guidance apparatus.

In the preferred embodiment film, 18 has a plurality of different colors thereon which are adjacent to and touch one another. However, a single color film also may be utilized. Additionally, the colors on film 18 may be arranged in distinct patterns to provide a desired visual effect. In the preferred embodiment, the top half of the film has a transparent red coating thereon and the bottom half of the film has a transparent green coating thereon which borders the red color. The size (height and width of film 18) may vary but generally extends across a portion of light housing 25.

Guidance apparatus 10 includes a light source or backlight 20 positioned within light housing 25 at the end remote from lens 14 and behind the focal point 16 of lens 14. Backlight 20 projects the red and green colors on color film 18 forwardly onto the back side 22 of lens 14. The curvature of lens 14 is such that the red and green color rays or bands of light passing therethrough are projected outwardly in parallel bands and are focused essentially at infinity. Thus, when the eye of a vehicle operator comes within one of the red or green color bands, he will see only the color for that band.

It has been found to be advantageous to provide a third projected light band which surrounds or encompasses the two contiguous red and green bands to broaden the area within which an operator may encounter a band of light from the guidance device. To accomplish this, a yellow filter or coating 17 may be applied to the front surface 13 of objective lens 14. The color yellow was chosen because it permits the green and red light bands to pass therethrough unaltered. Thus, in the annular area outside of the projected red and green colored bands, a yellow light band will be projected as may be seen by referring to FIG. 2.

From the above, it may be apparent that the operator of a vehicle approaching the optical guidance device 10 initially will see a yellow light and thereafter, as he approaches the device 10 and becomes properly aligned with a predetermined location or path he will encounter a green or red light. The angle of incidence "A" of the device 10 should be set such that the operator will see a green light as he approaches the predetermined location "P" and thereafter will see only a red light when he arrives at location P. It is to be understood that although the angle of incidence is an upwardly extending angle from the horizontal since the optical guidance apparatus aims upward, apparatus 10 can be located above the vehicle operator and aimed downward whereupon the angle of incidence will be a downwardly extending angle.

Although for many applications the green light band will provide sufficient lateral alignment information to an operator, the lateral alignment of a vehicle with respect to a desired or predetermined location may be more precisely indicated to an operator by utilizing various directional indicia. Such directional indicia preferably are located upon a directional indicia media or film 30. The position of film 30 is desirably within light enclosure 25 as between color film 18 and lens 14 and located laterally of the red and green color projection area but within the yellow projection area.

Figure 4A:
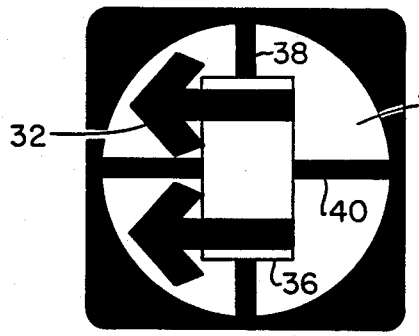
FIGS. 4A through E illustrate various directional indicia which may appear on a lens in the guidance apparatus to assist an operator in determining the position of his vehicle with respect to a designated location.

Directional indicia film 30 preferably consists of a clear plastic or glass film or sheet having directional indicia thereon such as arrows, centered crossbars, a centered rectangle, etc. Directional film 30 extends vertically and horizontally across a substantial portion of light enclosure 25 and may be mounted therein by any conventional means such as a lens holder frame. In the preferred embodiment, arrows 32 are provided on film 30 to indicate to an operator the direction he must move for proper lateral alignment to approach a predetermined position or path. The arrows 32 are imprinted on the indicia film 30 laterally such that they are projected outside of the red and green light lanes but within the yellow light projected area as mentioned previously. When facing the lens 14 of optical guidance apparatus 10 the right side of film 30 has arrows 32 applied thereon pointing to the left and the left side of film 30 has arrows applied thereon pointing to the right. Thus, when a vehicle operator is positioned to the right of a proper alignment path with respect to a predetermined position but within the lateral yellow light band, he will see arrows 32 in the lighted apparatus pointing to the left as shown in FIG. 4A. Of course if he were positioned to the left of a proper alignment path he would see arrows 32 pointing to the right. It has been determined that in some instances the directional arrows may be utilized with a single color light band to guide a vehicle operator and that multiple colored light bands are unnecessary.

Figure 4B:
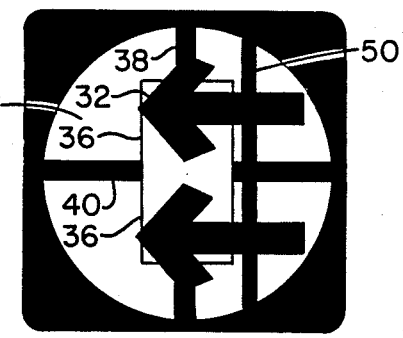

From the above, it may be seen that the directional indicia film 30 provides the operator of a vehicle with a visual indication of whether he is to the left or to the right of a proper lateral alignment path with respect to a predetermined position or path. As mentioned previously, when a vehicle operator is in the proper lateral alignment path, he will see a green light band "G" in FIGS. 4C and 4D. Should the vehicle operator stray to the left or right of the green light band, he will pass into the yellow light band "Y" in FIGS. 4A and 4B, and again be guided by the directional indicia arrows 32 back into the path of the green light band. When the operator sees the red light band "R" in FIG. 4E, he has reached the predetermined position.

Figure 4C:
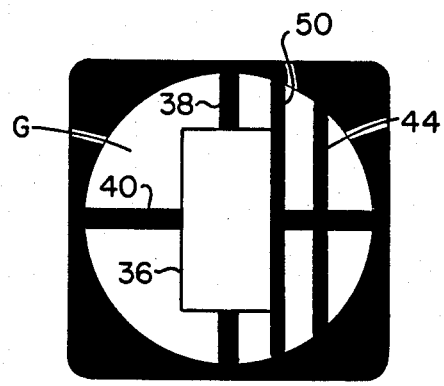
Figure 4D:
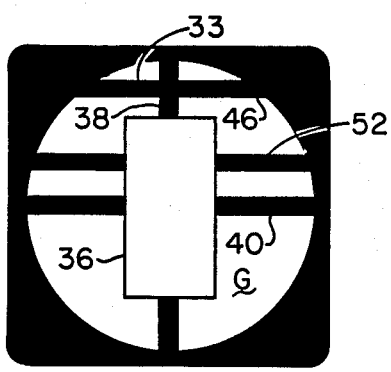
Figure 4E:
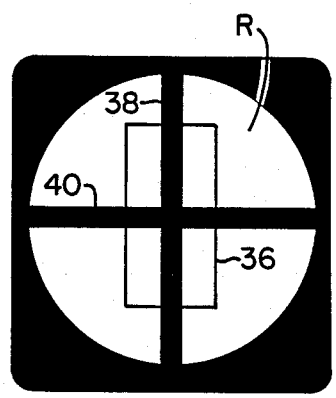

Of course, directional guidance indicia in addition to the arrows 32 may be utilized to provide an additional indication of the distance of the vehicle from a predetermined position as well as to indicate the direction the vehicle must move for proper lateral alignment position with a predetermined path. Referring to FIG. 4A, a rectangular box 36 having a fixed vertical line or bar 38 and a fixed horizontal line or bar 40 extending from the outside of the box 36 may be imprinted on the central portion of film 30 such that it may be projected in the green light band. Additionally, "fast moving directional indicia" including a "fast moving" vertical bar 44 and a fast moving horizontal bar 46 may be utilized in conjunction with the rectangular box 36 to provide additional information to an operator guiding a vehicle. Vertical and horizontal bars 44 and 46 preferably are applied to the front of objective lens 14 as on film 28 such that they appear to a vehicle operator to have an increased rate of movement as the operator approaches apparatus 10. The height of the horizontal bar 46 seen in FIG. 4D indicates the distance of the vehicle from a predetermined location. The optical viewing apparatus 10, would indicate the vehicle is at the predetermined location when bar 46 appears to be located in the center of the rectangular box 36 overlying fixed horizontal line 40 as shown in FIG. 4E. From the above it may be seen that as an operator moves toward a predetermined location, the horizontal fast moving bar 46 will appear to move downwardly across the lighted green light lane and enter the rectangular box 36, as shown in FIG. 4D.

As the operator moves closer to the guidance device 10, the bar 46 will continue to move downwardly across the box 36 until it coincides with the fixed horizontal line 40 whereupon the red light will appear indicating the operator has arrived at the predetermined location.

In a similar manner, vertical fast moving bar 44 provides an active indication of lateral alignment for a vehicle. As shown in FIG. 4C, bar 44 will indicate lateral alignment by its position with respect to fixed line 38. When the moving vertical bar 44 becomes aligned with the fixed vertical line 38 on the rectangular box 36, the operator is on a proper lateral alignment path. Of course bars 44 and 46 also may be printed or otherwise affixed to a separate fast moving directional media film not shown.

Optical guidance apparatus 10 may incorporate a "slow moving" directional indicia in conjunction with the "fast moving indicia." The "slow moving" indicia would appear to the vehicle operator before the "fast moving" indicia bars 44 and 46 and in the same manner would indicate the proper lateral alignment path for a vehicle approaching a predetermined location as well as the distance from the predetermined location. In order to have the "slow moving" indicia move at a slower rate and appear before the fast moving indicia, a "slow moving" vertical bar 50 and horizontal bar 52 are applied to a directional indicia film or media 54 positioned in housing 12 between lens 14 and directional film 30. Desirably, indicia film 54 is located in lighthousing 25 in front of indicia film 30 as illustrated in FIG. 1. The location of directional indicia film 54 may be adjusted until the desired rate of movement of bars 50 and 52 has been achieved with respect to a vehicle operator. In the preferred embodiment, bars 50 and 52 would appear within the green light band. The horizontal bar 52 is applied to indicia film 54 at a position such that alignment thereof with the fixed horizontal line 40 projecting from the rectangular box 38 on directional film 30 indicates to an operator that he is at the predetermined position P. Thus, it may be seen that slow horizontal bar 52 appears to move downwardly as an operator approaches a predetermined position as shown in FIG. 4D. As it moves downwardly fast moving horizontal bar 46 will become visible and both bars 46 and 52 will move downwardly until they both coincide with the horizontal line 40 as shown on FIG. 4E indicating the predetermined location has been reached. The slow moving vertical bar 50 on indicia film 30 provides an additional early indication of the lateral position of the vehicle with regard to being to the left or right of a proper alignment path. Thus, the slow moving vertical bar 50 will appear to the operator as he moves toward the alignment path after viewing the directional arrows 32. Thereafter, the fast moving vertical bar 44 will appear and both bars 44 and 50 will move towards the fixed vertical line 38 until they coincide with that line indicating the vehicle is in proper lateral alignment.

The location of the various directional and distance indicating indicia such as the rectangular box pattern 36 on directional indicia film 30, the slow moving bar components 50 and 52 on slow moving directional indicia film 54, and the fast moving bar components 44 and 46 located on or near objective lens 14 may be varied in relationship to one another as well as with respect to backlight 20 depending upon the particular application of the unitary optical guidance apparatus 10. Additionally, for some applications some of the directional and distance indicating indicia described above may not be utilized. Furthermore, more or less color bands may be utilized. Although apparatus 10 has been described with regard to docking an aircraft, it has been found that the apparatus may be utilized to guide operators of ships, drivers of motor vehicles and pilots of aircraft landing on ships or on airfields. The optical viewing apparatus also may be utilized to park motor vehicles and to dock ships as well as aircraft. The various directional indicia media 30 and 54 need not be located in front of color film 18 but may be located in back of the color film 18 as between it and light source 20.

Hence, the location of the directional indicia films 30 and 54 as well as fast moving film 28 may be varied to tailor make a specific guidance apparatus with regard to when an operator encounters the light and the relative rate of movement of the various indicia. Although the color film 18 preferably is located at the focal point 16 of objective lens 14, it may be located slightly in front of or behind the focal point 16. However, it has been found that where the color film 18 is not located substantially at the focal point 16, the colors thereon will not be projected out in substantially parallel bands and some blurring may occur particularly at the junction of adjacent colors.

Figure 2:
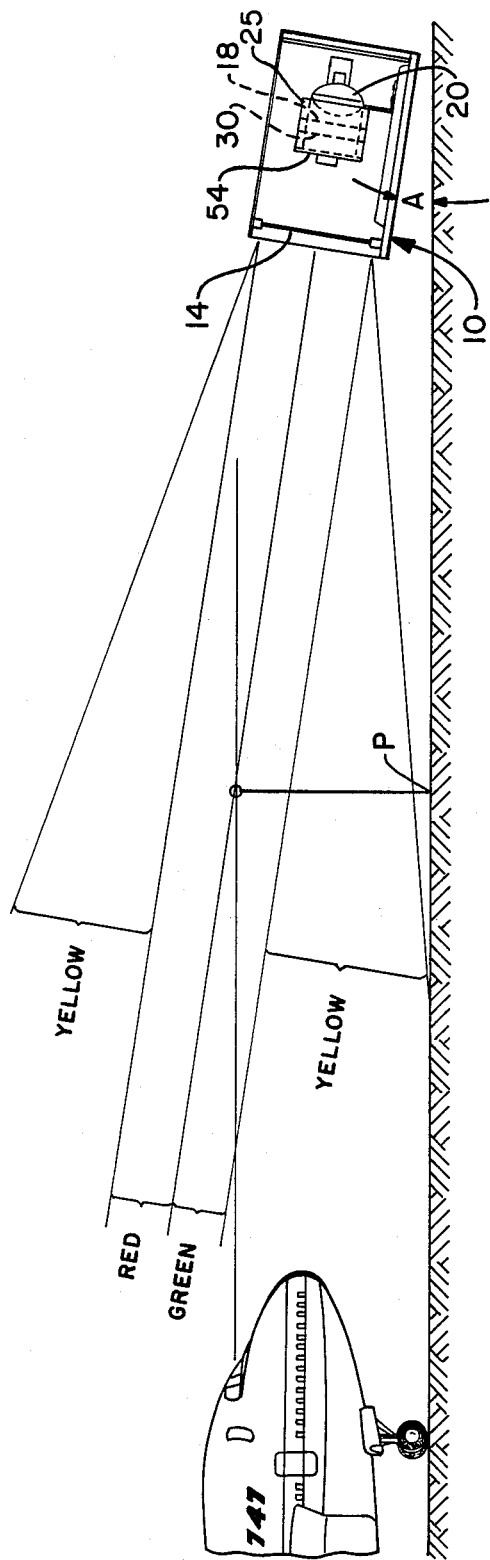
FIG. 2 is a diagrammatical side elevational view showing the projection of different colored lanes of light from the optical guidance apparatus of the present invention to an operator of an aircraft.

In order for the optical guidance apparatus 10 of the present invention to function properly, the colored light lanes must be projected outwardly at a particular angle of incidence with regard to the eyes of the operator in an approaching vehicle. To achieve this result, the housing 12 of the guidance apparatus 10 may be pivotally mounted above and behind or below and behind a predetermined position as depicted in FIG. 2. One pivotal mounting structure may be observed by referring to FIG. 3B. This structure utilizes a fixed pivotal mounting 58 and a movable pivotal mounting 60. Mounting 60 includes a pivot pin 62 which is connected to one end of a pivot arm 64. The other end of pivot arm 64 is connected to one end of a link 66 that is affixed to and driven by an electric motor 68. Motor 68 may be controlled from a remote location. Upon actuation of the electric motor 68 link 66 will rotate and pivot arm 64 will be driven vertically upwardly or downwardly to raise or lower the end of housing 12 and thereby alter the angle of incidence of the light bands projected by the optical guidance apparatus 10. In order to avoid having to operate motor 68 to change the angle of housing 12 each time a different aircraft approaches a gate, a plurality of optical guidance apparatuses 10 may be mounted adjacent a parking gate as depicted in FIG. 3A. Each housing may be mounted at a different height and angled to project light bands at an appropriate angle of incidence with respect to a particular aircraft. The type of aircraft or a flight number may be displayed adjacent each apparatus 10. Preferably, these displays would be operable electrically from a remote location.

Operation of the preferred embodiment of optical guidance apparatus 10 with regard to guiding the pilot of an aircraft to a terminal gate will now be described. As the pilot approaches the gate, he selects the appropriate guidance apparatus 10 to view based upon the aircraft or flight number displayed adjacent the unit. As the pilot approaches the gate he will encounter a yellow light band. Thereafter, an arrow 32 will appear within the yellow light band indicating the lateral direction in which to proceed to properly align the aircraft with the gate. If the aircraft is too far to the right of the parking position, the arrows 32 will point to the left or if too far to the left the arrows will point to the right. As the pilot proceeds in the direction of the arrows 32, he will encounter the green light band and subsequently a slow moving vertical bar 50 will appear on the side of a rectangular box 36. As the pilot proceeds toward the proper alignment path, a fast moving vertical bar 44 will appear. The apparatus 10 will provide an indication the vehicle is in proper lateral alignment when the pilot sees the slow and fast moving bars 50 and 44 overlying the vertical line 38 projecting from the rectangular box 36.

As the pilot moves toward the gate he will encounter a slow moving horizontal bar 52 moving downwardly towards the center of the rectangular box 36 all within the green light band. As the pilot approaches the parking position, the slow moving bar 52 will move closer to the center of the box and thereafter a fast moving horizontal bar 46 also will appear downwardly from the top of the apparatus 10 toward the horizontal line 40 projecting from the box 36. At the parking position the slow and the fast moving horizontal bars 52 and 46 will appear to overlap the horizontal line 40 of the rectangular box 36, and the lens color will change from green to red.

Since certain changes may be made to the above-described apparatus, system and method without departing from the scope of the invention herein, it is intended that all matter contained in the description thereof or shown in the accompanying drawings shall be interpreted as illustrative and not in a limiting sense.

What is claimed is:

1. An optical guidance system for directing a vehicle operator, comprising:
    a housing, a positive lens, said positive lens mounted in said housing, said positive lens having a focal point spaced from said lens, said focal point located within said housing, a multiple color film, said multiple color film located in the vicinity of said focal point, said multiple color film having at least two different colors thereon;
    a backlight located at a position with respect to said focal point to substantially project said colors of said multiple color film substantially outward of said housing in a lane after passing through said positive lens;
    a second color film positioned between said multiple color film and said operator to provide a background color wherein said second color film allows said projected multiple color of said multiple color film to pass therethrough unimpeded; and
    wherein said projected colors of said multiple colored film are encompassed by said background color.

2. An optical guidance system according to claim 1, comprising:
    a directional indicia film mounted in said housing wherein said directional indicia film is spaced from said multiple color film; and
    wherein said backlight is positioned such that a directional indication is projected toward an operator within said background color light after passing through said positive lens.

3. An optical guidance system according to claim 2, wherein said directional indicia film is positioned intermediate said multiple color film and said positive lens, and wherein said directional indicia film has indicia thereon positioned laterally of said multiple color light passing therethrough whereby said indicia is projected outwardly of said housing and laterally of said multiple color light.

4. An optical guidance system according to claim 3, further comprising a slow moving indicia film and wherein said slow moving indicia film is located between said positive lens and said directional indicia film.

5. A unitary optical guidance apparatus for directing a vehicle operator, comprising:
    a lens, said lens having a focal point located outside of said lens,
    a multiple colored substantially transparent media, said multiple colored media located in the vicinity of said focal point,
    a light source, said media located intermediate said focal point and said light source wherein said colors of said colored media are projected onto said lens and outwardly of said optical guidance apparatus in an arcuate projection;
    said multiple colors are projected outward in substantially parallel rays;
    a neutral colored media surrounding said multiple colors, and
    said neutral color being projected outwardly in an expanding corridor.

6. A unitary optical guidance apparatus according to claim 5, including at least one indicia media;
    said indicia media spaced apart from said multiple colored media; and
    said indicia of said indicia media located in said expanding corridor.

7. A unitary optical guidance apparatus according to claim 6, wherein said indicia media is located in front of said multiple colored media and wherein said multiple colors are focused at infinity.

8. An optical guidance apparatus for directing a vehicle operator, comprising:
    a housing, a positive lens, said lens mounted in said housing, said lens having a focal point spaced from said lens, said focal point located within said housing, a color media, said color media located in the vicinity of said focal point,
    a backlight located at a position with respect to said focal point to substantially project said color of said color media substantially outwardly of said housing toward said operator in a parallel colored light lane after passing through said positive lens; a second color media positioned between said color media and said operator to provide a background color wherein said second color media allows said projected color of said first media to pass therethrough unimpeded; and
    wherein said projected color of said first media is encompassed by said background color.

9. The optical guidance apparatus of claim 8, including a directional indicia media mounted in said housing wherein said directional indicia media is spaced from said color media; and
    wherein said backlight is positioned such that a directional indication is projected towards an operator within said colored light lane after passing through said positive lens.

10. The optical guidance apparatus of claim 8, further comprising a third color media for projecting a second color lane toward said operator, and a directional indicia media within said housing for projecting a directional indicia within one of said first or second color lanes toward said operator.

11. The optical guidance apparatus of claim 10, wherein said second color lane encompasses said first color lane and said directional indicia are projected within said second color lane.

12. The optical guidance apparatus of claim 8, wherein said first color media includes a plurality of different colors and a plurality of colored light lanes are projected toward said operator; and
   further comprising a background color media for projecting a background color light lane toward said operator which encompasses said plurality of colored light lanes.

13. The optical guidance apparatus of claim 12, further comprising a directional indicia media within said housing for projecting a directional indicia within said background color light lane.

14. The optical guidance apparatus of claim 9, including a second directional indicia media and said second directional indicia media is mounted within said housing intermediate said lens and said first directional indicia media.

15. The optical guidance apparatus of claim 14, including a third directional indicia media and said third directional indicia media is mounted adjacent said positive lens.

* * * * *